Sept. 3, 1935.  H. W. ZIMMERMAN  2,013,374
CONNECTING ROD ALIGNMENT GAUGE
Filed April 6, 1933    2 Sheets-Sheet 1

Inventor
Herman W. Zimmerman

Sept. 3, 1935.  H. W. ZIMMERMAN  2,013,374
CONNECTING ROD ALIGNMENT GAUGE
Filed April 6, 1933   2 Sheets-Sheet 2
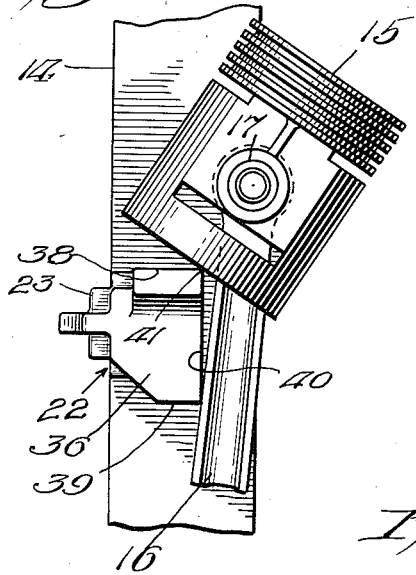
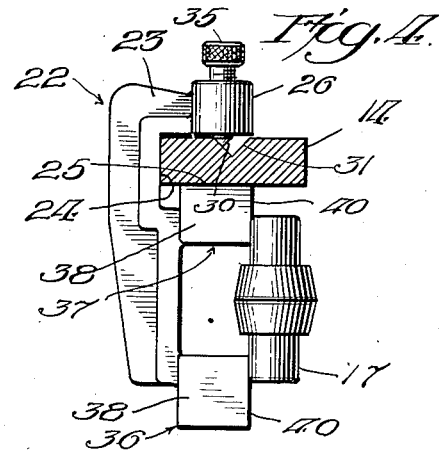
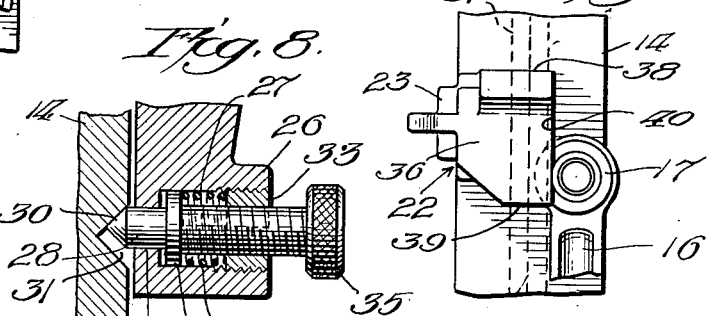
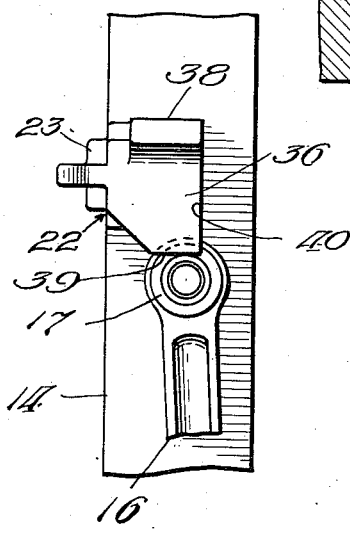
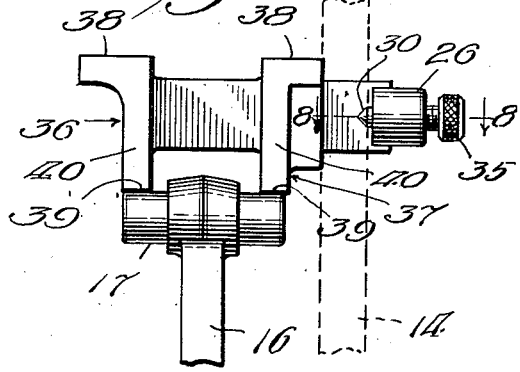
Inventor:
Herman W. Zimmerman
by Rector, Hibben, Davis & Macauley
Attys Patented Sept. 3, 1935

2,013,374

UNITED STATES PATENT OFFICE 2,013,374

CONNECTING ROD ALIGNMENT GAUGE

Herman W. Zimmerman, Chicago, Ill., assignor to Automotive Maintenance Machinery Co., Chicago, Ill., a corporation of Illinois Application April 6, 1933, Serial No. 664,701

3 Claims. (Cl. 33—180)

My invention relates generally to connecting rod alignment gauges of the type disclosed in my copending application, Serial No. 533,891, and it has to do more particularly with gauging means therefor.

One of the objects of my invention is to provide an improved connecting rod alignment gauge which is quite accurate in gauging operations, is simple in construction, and is cheap to manufacture.

Another object is to provide an improved gauging carriage or member adapted for accurate determination of twist, bend, and other disalignment conditions of connecting rod and piston assemblies as well as the separate parts thereof.

A more specific object is to provide a gauge carriage or member adjustably carried by a support and which is provided with a plurality of gauging surfaces adapted to be engaged by the bottom edge of a piston skirt for alignment gauging of an assembled piston and connecting rod and other surfaces adapted to be engaged by a connecting-rod-carried piston pin for alignment gauging of the connecting rod with the piston removed.

Other objects and advantages will become apparent as this description progresses and by reference to the drawings showing one form of structure embodying the invention.

In the drawings,—

Fig. 3 is a partial view of the structure shown in Fig. 2, the piston and gauge carriage being shown in position for determining twist distortion of the connecting rod and piston assembly;

Fig. 4 is a top plan view, partially in section, of the gauging means, illustrating the parts in position for gauging a connecting rod for twist distortion with the piston removed;

Fig. 5 is an elevational view of the structure of Fig 4;

Fig. 6 is a view similar to Fig. 5 except illustrating the connecting rod in position, with respect to the gauge carriage, for determining bend distortion thereof;

Fig. 7 is an elevational view taken substantially at right angles to the structure shown in Fig. 6; and Fig. 8 is an enlarged sectional view taken substantially on line 8—8 of Fig. 7.

Figure 1:
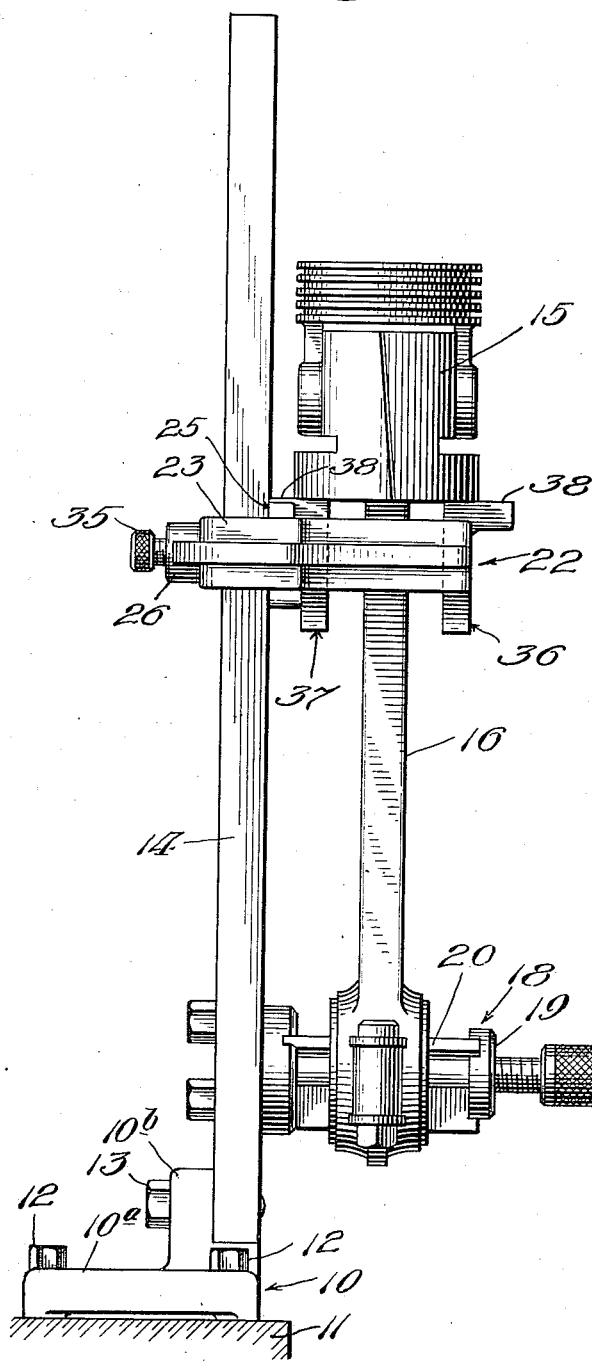
Figure 1 is an elevational view of the gauging structure and illustrating the same in gauging association with a connecting rod and piston assembly, the parts being shown in position for determining bend distortion of the assembled structure.

Referring particularly to the drawings, the tool which I have chosen to illustrate my invention includes a right-angled base member 10 having a horizontal leg 10$^a$ adapted to be secured to a supporting surface 11 by screw bolts 12 or other suitable fastening means. The vertical leg 10$^b$ of the base member fixedly supports a rectangularly-shaped, vertically-disposed plate 14 which is finished to uniform rectangular dimensions throughout. It is to be understood that while this form of mounting well serves my purpose the plate 14 may in certain instances be mounted in horizontal position without departing from my invention.

The connecting rod and piston assembly may include a piston 15 of any well known form and a connecting rod 16 operatively joined thereto by a conventional piston pin 17. The gauging structure includes an adjustable device 18 for rotatably supporting the crankshaft end of the connecting rod. This device 18 is mounted and constructed similarly to the connecting rod support disclosed in my aforesaid co-pending application. Briefly, this supporting device includes a cage-like body 19 in which are carried a plurality of radially adjustable support or guide members 20. These latter members are adjustable radially by an adjusting nut 21. The cage body 19 is rigidly supported by the plate 14 with the axis of the latter at right angles to the plane of the supporting face of the plate. By radially adjusting the members 20, the connecting rod support is readily and quickly adjusted to accommodate a great number of different size connecting rods.

The gauging structure further includes a gauge carriage or member 22 which is mounted upon the plate 14 for longitudinal adjustment movement therealong to properly relate the same to the structure to be gauged. This gauge carriage takes the form of a body formed from a single casting, and it is provided with a U-shaped clamp base 23 (Fig. 4) providing a rectangularly-shaped socket having its surfaces 24 and 25 finished at right angles with respect to each other for snug-fit, but slide, engagement with complementally finished edge and face surfaces on the supporting plate 14. The U-base is also provided with a boss 26 having a threaded recess 27 therein for reception of clamp means which is adapted to hold the carriage clamp surfaces 24 and 25 properly engaged with the adjacent plate face and edge surfaces, as well as to hold the gauge carriage in any predetermined position along the supporting plate.

This clamp means (Figs. 7 and 8), preferably, takes the form of a headed pin 28, the stem of which projects through an opening 29 in the clamp base, and the projecting end of this pin is provided with a tapered end 30 adapted to engage in off-center fashion the wall of a V-shaped groove 31 in the back of the plate 14, as more particularly pointed out in my aforesaid co-pending application. A spring 32 is mounted in the recess 27, being confined therein between a screw plug 33 and the head 34 of pin 28. The spring 32 is constantly under tension and it yieldingly presses the tapered end of the pin 28 into engagement with one side wall of the plate groove 31 so as to yieldably support the gauge carriage upon plate 14 in condition for slide movement along the plate upon application of slight pressure to the gauge carriage. To lock the gauge member in predetermined gauging position, I provide a clamp screw 35 which passes through a threaded opening in the screw plug 33 and which, upon being screwed inwardly, engages the head 34 of the pin 28 and positively moves the tapered end of the pin inwardly into firm and locking engagement with the plate groove wall.

The clamp carriage 22 is provided with spaced gauging elements 36 and 37 which include identical and aligned gauging surfaces. Specifically, each of these gauge members is provided with a finished and comparatively large horizontal top gauging surface 38, a relatively smaller bottom gauging surface 39 parallel with the surface 38, and another and vertical gauging surface 40 joining the surfaces 38 and 39. The surface 40 is disposed in a vertical plane intersecting the other surfaces at right angles. All of these surfaces lie in fixed planes parallel with the planes of the side edges of plate 14 and at right angles to the planes of the face of the plate 14 and the adjacent U-clamp socket surface 25. This relationship is accurately maintained in all positions of the gauge member along plate 14 by the engagement between the right angled clamp base surfaces 24, 25 and the complemental, right-angled edge and face surfaces of the plate 14. In this manner, these several gauging surfaces 38, 39 and 40 are maintained in planes parallel with the axis of the connecting rod support 18 which is disposed at right angles to the plane of the face of the plate 14. The gauge elements 36 and 37 are spaced apart such a distance and their gauging surfaces 38 to 40 inclusive are so related with respect to each other that a large range of different size pistons and connecting rods may be engaged therewith for accurate gauging as will now be described.

In the servicing of connecting rods and connecting rod and piston assemblies, it is often desirable in certain instances to test the same for twist, bend and other disalignment distortion without detaching the piston from the connecting rod. In other instances it may be desirable to test the connecting rod for such disalignment with the piston detached. My invention is adapted for accurate gauging operations in both of these instances. It is also adapted for the gauging of connecting rod assemblies including pistons having cut-out (or any other irregularly-shaped) skirt portions such as the piston illustrated in the drawings.

Figure 2:
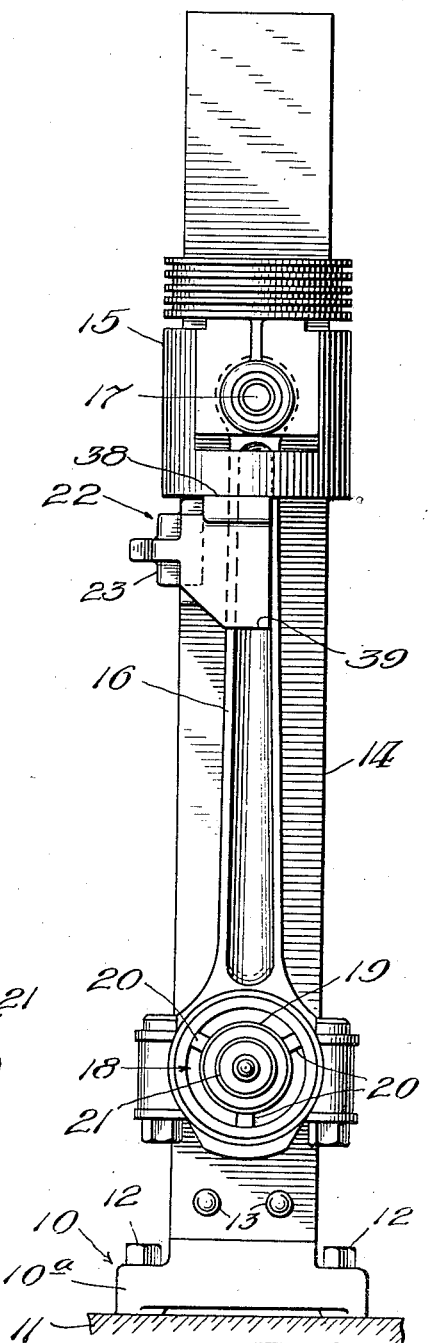
Fig. 2 is another elevational view taken substantially at right angles to the structure shown in Fig. 1.

More particularly, if it is desired to test a connecting rod and piston assembly for bend distortion of the connecting rod or other parts of the assembly, the gauge carriage 22 is moved along the plate 14 to a position wherein its top gauging surfaces 38 engage the bottom edge of the piston skirt as shown in Figures 1 and 2. Due to the right angled relationship between these surfaces and the face of plate 14 and their parallel relationship to the axis of the connecting rod support 18, bend distortion appearing in the connecting rod or piston or the connection between these parts will be indicated by non-uniform seating engagement between the gauging surfaces 38 of both gauging elements 36, 37 and the bottom edge of the piston skirt. If the connecting rod assembly is accurately aligned, the bottom edge of the piston skirt will obviously seat uniformly at all points upon the gauging surfaces 38. This gauging operation will indicate bend distortion with respect to the longitudinal median line of the connecting rod 16, the axis of the piston pin 17 and the longitudinal axis of the piston 15.

In gauging for twist distortion in the connecting rod and piston assembly, the connecting rod is rotated slightly away from the gauge carriage 22 and the piston 15 is rocked upon the pin 17 so that the bottom edge of its skirt may be engaged by the edge 41 between the right-angularly disposed front and top gauging surfaces 40 and 38 as shown in Fig. 3. If twist distortion exists in the connecting rod or other parts of the assembly, the bottom edge of the piston skirt will not seat uniformly upon the corner edges of both of the gauging elements 36 and 37. When the parts are in this particular gauging position bend distortion of the assembly parts may also be indicated.

In testing the connecting rod for twist distortion with the piston removed, the gauge carriage may be moved, with respect to the piston pin 17, to the position indicated in Figs. 4 and 5. If no disalignment of this character exists the projecting ends of the pin 17 which are seated against the front gauging surfaces 40 of both gauging elements 36, 37 will be uniformly seated against such surfaces. Twist disalignment will be indicated by the tipping of the pin 17 with respect to one of the gauging surfaces 40.

In testing the connecting rod for bend distortion, the parts may assume the position shown in Figs. 6 and 7. In this case, the connecting rod pin 17 is adapted to seat against the bottom gauge surfaces 39 and bend distortion will be indicated by lack of uniformity in engagement between the pin and such surfaces.

It will be seen from the foregoing, that I have provided a simple and efficient gauging device which may be readily and quickly adapted to a great number of different size connecting rods and connecting rod assemblies. The gauging operation may be performed accurately and quickly with or without the piston assembled on the connecting rod. Gauging operations with the piston assembled on the rod may be accurately carried out irrespective of the shape or character of the skirt wall of the piston.

It will be understood that while I have shown only one form of structure embodying my invention, other changes in details and arrangements of parts may be made without departing from the spirit and scope of my invention as defined by the claims which follow.

I claim:

1. In a tool of the class described, an imperforate supporting plate provided with a longitudinal groove therein and having a face and side edge finished at right angles to each other, a connecting rod support carried by said plate with the axis of the former at right angles to the face of the latter, means for adjusting said support to various sized connecting rod bearings, and a gauge carriage having finished right angled surfaces complementally engaged with said finished plate face and side edge, respectively, for slide movement along said plate toward and from said support, said carriage also having a plurality of finished gauging surfaces disposed in spaced parallel and horizontal planes intersected by a gauging surface disposed in a vertical plane at right angles thereto, all of said gauging surfaces being disposed at right angles to said plate parallel with the axis of said support, with certain of said gauging surfaces adapted for engagement with the bottom edge of the piston skirt and other of said engaging surfaces adapted for engagement with the connecting-rod-carried piston pin, and spring tensioned means carried by said carriage for maintaining a slide-fit engagement between said plate face and said carriage and positive locking means for fixing said carriage in predetermined positions relative to said plate.

2. In a connecting rod alignment gauge, a supporting plate having a longitudinal groove therein, a unitary and adjustable connecting rod bearing support carried by said plate at right angles thereto, a gauge member mounted on said plate for slide movement therealong toward and from said support, said gauge member having spaced pairs of gauge elements having gauging surfaces disposed in planes intersecting each other at right angles and disposed at right angles to said plate parallel with the axis of said support, certain of said gauging surfaces being adapted for engagement with the bottom edge of the skirt of a connecting-rod-carried piston and other of said surfaces being adapted for engagement with the end portions of a connecting-rod-carried piston pin, and adjustable spring tensioned means in engagement with said groove for holding said gauge member in position along said plate and positive locking means for fixing said gauge member in any predetermined position relative to said plate.

3. In a tool of the class described, the combination of an imperforate plate provided with a longitudinal groove therein and having a finished face and a finished side edge disposed at right angles to each other, a gauge carriage which comprises a clamp base element having a U-shaped socket with its inner U-base surface and one of its inner side surfaces finished at right angles to each other and adapted to fit, respectively, the finished side edge and face of said plate, spring tensioned means carried by the other side of said socket and yieldably engageable with the longitudinal groove for securing said clamp base element and gauge carriage in different positions upon said plate and for maintaining said fit relationship between said finished plate and clamp socket surfaces, and a pair of spaced gauge elements each having top, side and bottom engaging surfaces which successively connect at right angles, said gauging surfaces being also located in planes disposed at right angles to said finished socket side wall and said finished plate face, said top gauging surface and the edge surface between it and the gauging surface joined thereto being adapted for engagement with the bottom of the piston skirt while the other of said gauging surfaces is adapted for an engagement with the end portions of a piston pin.

HERMANN W. ZIMMERMAN.